US010876940B2

(12) United States Patent
Tsuji

(10) Patent No.: US 10,876,940 B2
(45) Date of Patent: Dec. 29, 2020

(54) MATERIAL TESTING MACHINE WITH A CONTROL DEVICE FOR CABLE DISCONNECTION WARNING

(71) Applicant: SHIMADZU CORPORATION, Kyoto (JP)

(72) Inventor: Hiroshi Tsuji, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/383,678

(22) Filed: Apr. 15, 2019

(65) Prior Publication Data

US 2019/0368987 A1  Dec. 5, 2019

(30) Foreign Application Priority Data

May 30, 2018  (JP) .................................. 2018-103659

(51) Int. Cl.
  *G08B 21/00*  (2006.01)
  *G01N 3/06*  (2006.01)
  *G01N 3/08*  (2006.01)

(52) U.S. Cl.
  CPC .............. *G01N 3/066* (2013.01); *G01N 3/08* (2013.01); *G01N 2203/0204* (2013.01); *G01N 2203/0617* (2013.01); *G01N 2203/0676* (2013.01)

(58) Field of Classification Search
  CPC ... G01N 2203/0202; G01N 2203/0204; G01N 2203/0617; G01N 2203/0676; G01N 3/066; G01N 3/08
  USPC ........................................................ 340/665
  See application file for complete search history.

(56) References Cited

U.S. PATENT DOCUMENTS

| 7,068,044 B1* | 6/2006 | Lo ........................... H04L 1/248 324/524 |
| 7,768,418 B2* | 8/2010 | Nordin .................... H04Q 1/136 340/686.4 |
| 2015/0285849 A1* | 10/2015 | Sako ....................... G01R 35/00 324/538 |

FOREIGN PATENT DOCUMENTS

| JP | H0595414 | 4/1993 |
| JP | 2005156193 | 6/2005 |
| JP | 2006017701 | 1/2006 |
| JP | 2007078560 | 3/2007 |
| JP | 4405242 | 1/2010 |

(Continued)

OTHER PUBLICATIONS

"Search Report of Europe Counterpart Application", dated Sep. 20, 2019, p. 1-p. 8.

*Primary Examiner* — Mark S Rushing
(74) *Attorney, Agent, or Firm* — JCIPRNET

(57) ABSTRACT

There is provided a material testing machine that a control device of the material testing machine includes a detection circuit which extracts a resistance component caused by the physical quantity and a capacitive component caused by an electrostatic capacitance of the cable from a measurement signal from the detector, a memory element which stores a normal capacitive component extracted by the detection circuit, and a comparator which compares the current capacitive component extracted by the detection circuit with the normal capacitive component, and when a comparison result from the comparator indicates that a value of the current capacitive component varies beyond a predetermined allowable range with respect to the normal capacitive component, it is treated that the cable is disconnected, and a disconnection warning is provided.

4 Claims, 3 Drawing Sheets

(56) References Cited

FOREIGN PATENT DOCUMENTS

| JP | 2012047636 | 3/2012 |
|----|------------|--------|
| JP | 2017138172 | 8/2017 |
| JP | 2017169263 | 9/2017 |
| WO | 2017158753 | 9/2017 |

* cited by examiner

MATERIAL TESTING MACHINE WITH A CONTROL DEVICE FOR CABLE DISCONNECTION WARNING

CROSS-REFERENCE TO RELATED APPLICATION

This application claims the priority of Japan patent application serial no. 2018-103659, filed on May 30, 2018. The entirety of the above-mentioned patent application is hereby incorporated by reference herein and made a part of this specification.

BACKGROUND

Technical Field

The disclosure relates to a material testing machine in which a detector is connected to a control device via a cable.

Description of Related Art

A material testing machine which performs material testing to evaluate strength or properties of a material includes a detector which measures a physical quantity, such as a displacement meter for measuring displacement corresponding to elongation of a test piece or a load cell for measuring a test force given to the test piece. The displacement meter and the load cell are connected to a control device of the material testing machine, and a measuring circuit for the displacement meter and a measuring circuit for the load cell are disposed in the control device. Additionally, the control device displays data obtained from these detectors on a display device (refer to Patent Document 1).

The control device and the detectors are connected by cables. Patent Document 2 proposes an abnormality detection device including a disconnection detection circuit for detecting an abnormality such as disconnection or a short circuit of a cable.

PATENT DOCUMENTS

[Patent Document 1] Japanese Laid-open No. 2017-138172
[Patent Document 2] Japanese Patent No. 4405242

The disconnection detection circuit in the abnormality detection device of Patent Document 2 is present separately from a strain measurement circuit, and the strain measurement circuit is input a normal measurement signal of a detector configured with a strain gauge bridge circuit. Therefore, when it is required to detect the disconnection of the cable, it is necessary to switch an input from the strain gauge bridge circuit to the strain measurement circuit to an input from the strain gauge bridge circuit to the disconnection detection circuit.

In such a switching method in which a signal from the strain gauge bridge circuit is input to either one of the circuits as described above, the disconnection detection circuit and the measurement circuit cannot be operated at the same time. Thus, the disconnection of the cable cannot be detected during the measurement, it may take time for the user to notice the disconnection of the cable, and the test piece or test time may go to waste.

SUMMARY

There is provided a material testing machine including a load mechanism configured to apply a test force to a test piece, a detector configured to measure a physical quantity when the test force is given to the test piece by the load mechanism, a control device, a cable configured to connect the detector with the control device, and a display part configured to display a measurement result of the detector, wherein the control device includes a detection circuit which extracts a resistance component caused by the physical quantity and a capacitive component caused by an electrostatic capacitance of the cable from a measurement signal from the detector, a memory element which stores a normal capacitive component extracted by the detection circuit, and a comparator which compares the current capacitive component extracted by the detection circuit with the normal capacitive component, and when a comparison result from the comparator indicates that a value of a current capacitive component varies beyond a predetermined allowable range with respect to the normal capacitive component, it is treated that the cable is disconnected, and a disconnection warning is provided.

DESCRIPTION OF THE EMBODIMENTS

The embodiments of the disclosure provide a material testing machine capable of easily detecting disconnection of a cable at any time.

According to the embodiments of the disclosure in the material testing machine described, the control device may provide the disconnection warning by displaying a warning on the display part.

According to the embodiments of the disclosure in the material testing machine described, the detector may be a load cell which has a strain gauge bridge circuit as a physical quantity detection mechanism and measures a test force applied to the test piece, or a displacement meter which has the strain gauge bridge circuit as the physical quantity detection mechanism and measures elongation of the test piece.

According to the embodiments of the disclosure in the material testing machine described, since the comparator which extracts the resistance component caused by the physical quantity of the detector and the capacitive component caused by the electrostatic capacitance of the cable from the measurement signal from the detector by the detection circuit and compares the normal capacitive component with the current capacitive component is provided, it is possible to detect whether or not the cable is disconnected and to provide a user with the disconnection warning even during the measurement of the physical quantity by the detector. Since the configuration of the detection circuit is used as it is for the detection of the capacitive component, it is unnecessary to provide a circuit for detecting an abnormality of the cable separately from the measurement circuit like in the conventional case, and it is possible to detect the disconnection of the cable with a simple configuration.

Figure 1:
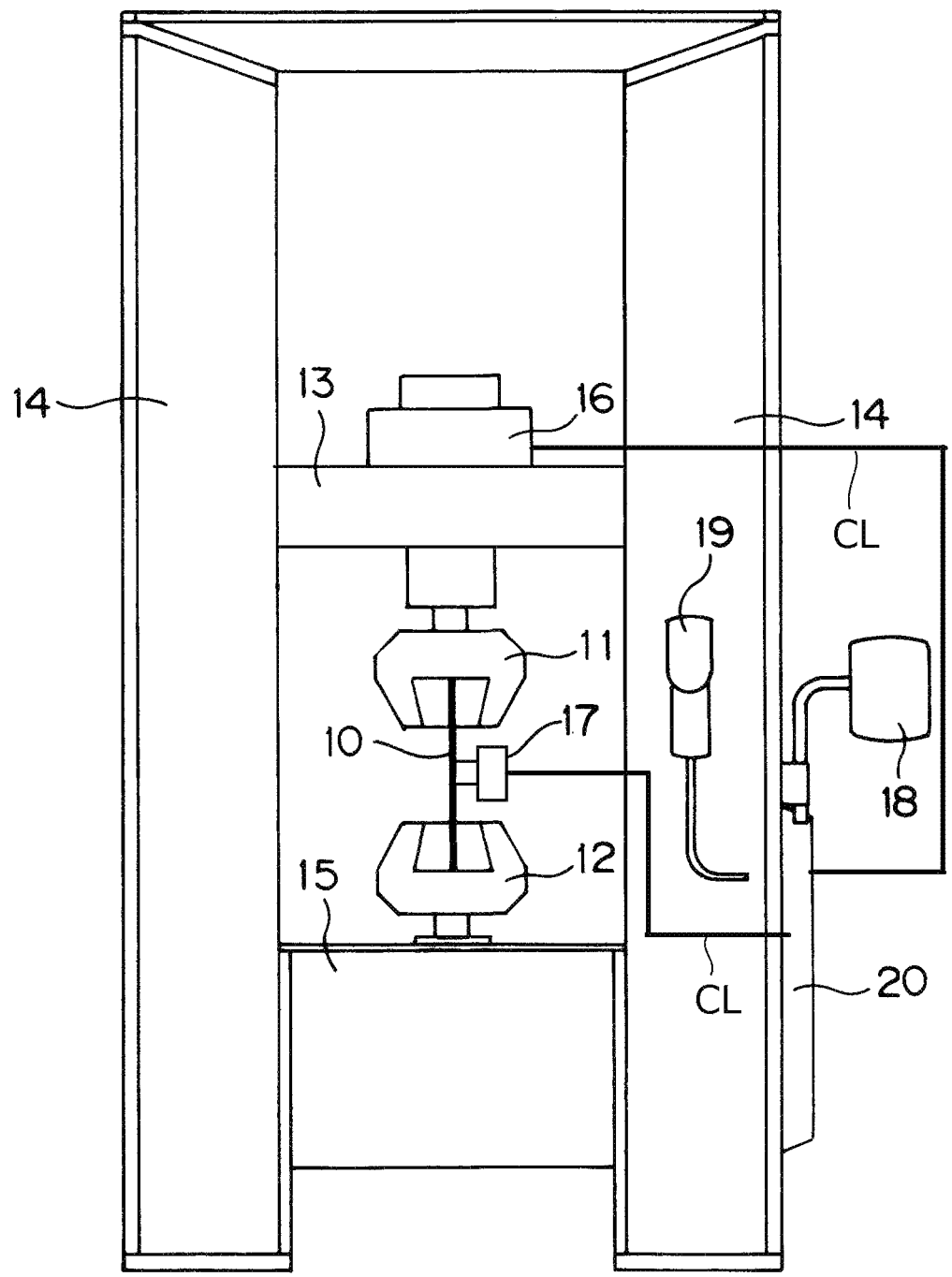
FIG. 1 is a schematic front view of a material testing machine according to an embodiment of the disclosure.

Hereinafter, embodiments of the disclosure will be described with reference to the drawings. FIG. 1 is a schematic front view of a material testing machine according to an embodiment of the disclosure.

In this material testing machine, a test piece 10 is placed in a test space of a material testing machine body surrounded by a crosshead 13, a base 15, and covers 14 mounted upright on the right and left sides of the base 15, and a tensile test is performed as a material test. The test piece 10 is disposed in the test space by an upper gripper 11 disposed on the crosshead 13 side and a lower gripper 12 fixed to the base 15 grasping both ends thereof. Further, the material testing machine includes a load cell 16 which is a detector for detecting a test force applied to the test piece 10, and a displacement meter 17 which detects elongation occurring in the test piece 10. Each of the load cell 16 and the displacement meter 17 has a strain gauge bridge circuit as a detection mechanism which converts a physical quantity in the test piece 10 into an electric signal. Additionally, cables CL connect the load cell 16 to the control device 20 and the displacement meter 17 to the control device 20.

A nut portion (not shown) which is screwed with a pair of screw rods disposed in the cover 14 provided upright on the right and left sides of the base 15 is disposed at both ends of the crosshead 13. Additionally, the pair of screw rods rotate in synchronization with driving of a motor disposed in the base 15, and thus the crosshead 13 moves in the vertical direction. When the crosshead 13 is raised, a tensile load (the test force) is applied to the test piece 10.

The upper gripper 11 for gripping an upper end of the test piece 10 is mounted on the crosshead 13. On the other hand, the lower gripper 12 for gripping a lower end of the test piece 10 is mounted on the base 15. When the tensile test is performed, the crosshead 13 is raised in a state in which the both ends of the test piece 10 are gripped by the upper gripper 11 and the lower gripper 12, and thus a tensile test force is applied to the test piece 10.

The test force applied to the test piece 10 is detected by the load cell 16 disposed in the crosshead 13. An amount of displacement between upper and lower reference points of the test piece 10 is detected by a displacement meter 17 which is a contact type elongation detector. Signals from the load cell 16 and the displacement meter 17 are input to the control device 20 via a cable CL. The control device 20 creates a driving control signal of the motor for raising and lowering the crosshead 13, rotates a servo motor (not shown) through a servo amplifier (not shown) disposed inside the base 15, and thus operates a load mechanism. Accordingly, the crosshead 13 moves along a load axis, and various material tests, such as the tensile test, are performed. The displacement meter 17 may be a contact type or a non-contact type.

The control device 20 is configured by a computer, a sequencer, and peripheral devices thereof, has a microprocessing unit (MPU) 51 or a memory for temporarily storing an operation program or data necessary for controlling the machine, and controls the entire machine. The control device 20 is connected to an operation unit 19 used for starting and stopping a test, performing an operation for raising and lowering the crosshead 13, or the like, and a display part 18 for displaying the test force measured by the load cell 16 and the amount of displacement measured by the displacement meter 17.

Figure 2:
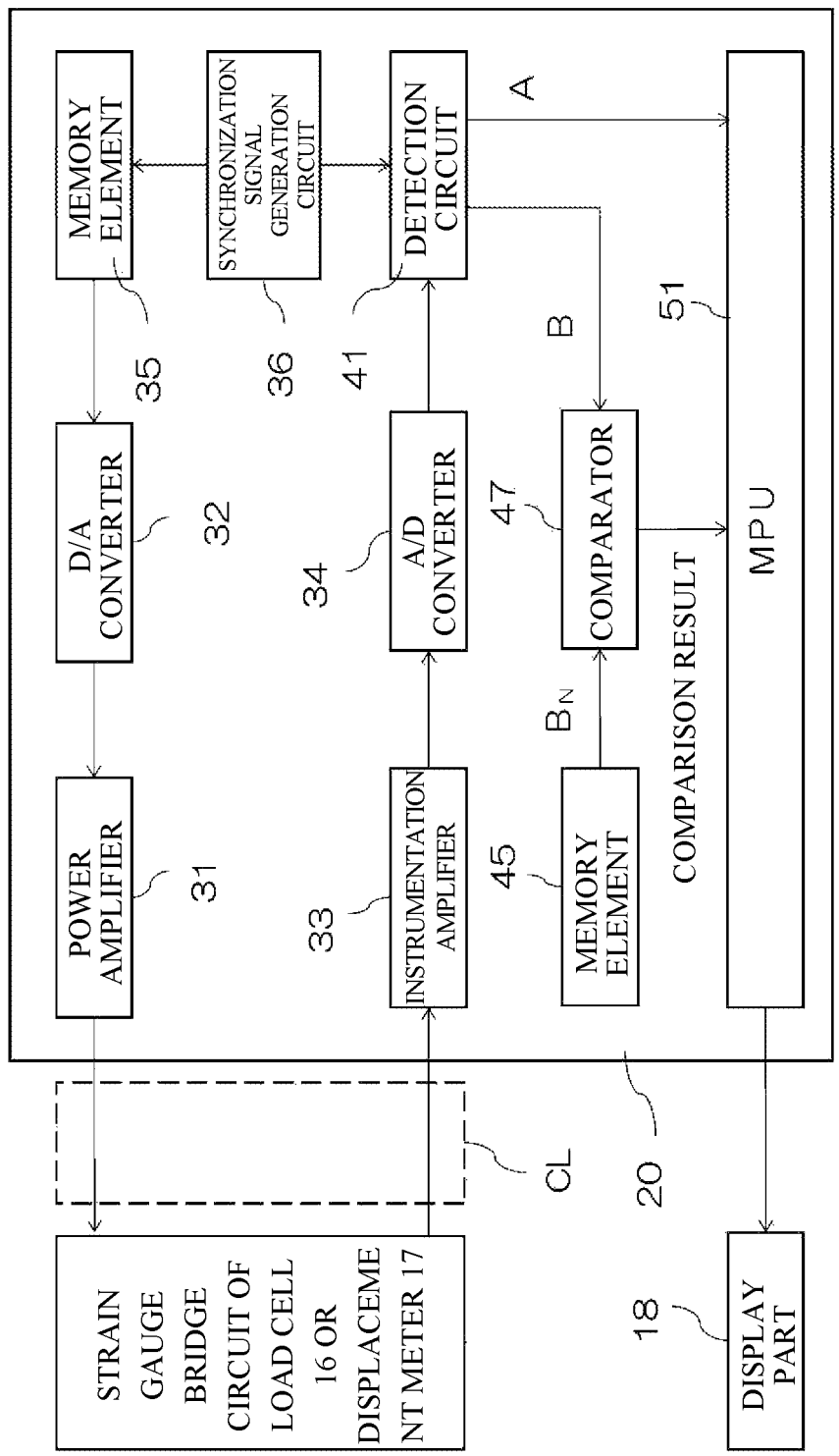
FIG. 2 is a block diagram showing a main functional configuration of a control device 20.

FIG. 2 is a block diagram showing a main functional configuration of the control device 20. In the control device 20 of the material testing machine, a plurality of units are provided as constituent units corresponding to functions of measuring instruments, sensors, and so on selected according to the test. FIG. 2 shows a carrier wave type (AC type) strain measurement circuit including a function block which outputs a signal to the strain gauge bridge circuit constituting a physical quantity detection mechanism of the load cell 16 or the displacement meter 17 and receives signal input from the strain gauge bridge circuit.

A memory element 35 which stores carrier wave data for exciting the strain gauge bridge circuit, a D/A converter 32 which performs digital-analog conversion of carrier waves, a power amplifier 31 which amplifies an analog-converted waveform, a synchronization signal generation circuit 36 which controls a timing of transmitting the carrier wave data from the memory element 35 to the D/A converter 32, an instrumentation amplifier 33 which amplifies a measurement signal input from the strain gauge bridge circuit, an A/D converter 34 which performs analog-digital conversion of the measurement signal, a detection circuit 41 which extracts a resistance component A and a capacitive component B from the measurement signal, a memory element 45 which stores a normal capacitive component $B_N$, a comparator 47 which compares a current capacitive component B with the normal capacitive component $B_N$, and the MPU 51 which performs display control of measurement results or the like on the display part 18 are disposed in the control device 20.

The carrier wave data which is sent from the memory element 35 to the D/A converter 32 in accordance with a timing signal from the synchronization signal generation circuit 36 and is analog-converted is amplified by the power amplifier 31, and then output from the control device 20 and input to the strain gauge bridge circuit of the detector via the cable CL. Carrier waves amplitude-modulated by strain are output from the strain gauge bridge circuit excited by the carrier waves and then input to the control device 20 via the cable CL. The signal received by the control device 20 is amplified by the instrumentation amplifier 33, digitized by the A/D converter 34 and then input to the detection circuit 41.

The synchronization signal which is the same as the timing at which it is input from the synchronization signal generation circuit 36 to the memory element 35 is input to the detection circuit 41. The detection circuit 41 is configured by a digital calculation circuit and extracts the resistance component A matching a phase of the carrier waves and the capacitive component B of which a phase is different by 90 degrees from the carrier waves among the components synchronized with the carrier waves of the input measurement signal. That is, in the strain measurement circuit shown in FIG. 2, the detection circuit 41 is provided to extract the resistance component A caused by the physical quantity, such as a force and a displacement, and the capacitive component B caused by an electrostatic capacitance which is parasitic on the cable CL irrespective of a force and a displacement. The resistance component A is proportional to an amount of change in the force or the displacement. The embodiments of the disclosure adopt a configuration in which the disconnection of the cable CL is detected using the fact that a value of the capacitive component B caused by the electrostatic capacitance which is parasitic on the cable CL changes when the cable CL is disconnected.

Here, in the strain gauge bridge circuit, a received signal f(t) can be expressed by the following equation (1) due to the resistance component A and the capacitive component B.

$$f = A \sin \omega t + B \cos \omega t \tag{1}$$

In Equation (1), ω is a frequency of the carrier signal, and for simplicity, a phase difference from the carrier waves is zero. In general, the Fourier transform $F(\omega)$ of the received signal $f(t)$ is expressed by the following Equation (2).

$$F(\omega) = \int_{-\infty}^{\infty} f(t) e^{-j\omega t} dt \quad (2)$$

In the detection circuit 41 of the strain measurement circuit shown in FIG. 2, convolution integration shown by the following Equation (3) is performed for each cycle of the carrier waves, and thus the resistance component A and the capacitive component B are extracted.

$$F_s(\omega) = \int_0^{\frac{2\pi}{\omega}} f(t) e^{-j\omega t} dt \quad (3)$$

In Equations (2) and (3), the component of which a phase coincides with sin $\omega t$ in Equation (1) is the resistance component A, and the component of which a phase coincides with cos $\omega t$ in Equation (1) is the capacitive component B. The resistance component A and the capacitive component B are extracted respectively from the following Equations (4) and (5).

$$\begin{aligned}
\mathrm{Im}[F(\omega)] &= \int_0^{\frac{2\pi}{\omega}} F(t)(-\sin\omega t) dt \\
&= -\int_0^{\frac{2\pi}{\omega}} (A\sin\omega t + B\cos\omega t)\sin\omega t\, dt \\
&= -A\int_0^{\frac{2\pi}{\omega}} (\sin\omega t)^2 dt - B\int_0^{\frac{2\pi}{\omega}} \cos\omega t \sin\omega t\, dt \\
&= \frac{A}{2}\int_0^{\frac{2\pi}{\omega}} (\cos 2\omega t - 1) dt - \frac{B}{2}\int_0^{\frac{2\pi}{\omega}} \sin 2\omega t\, dt \\
&= \frac{A}{2}\left[\frac{\sin\omega t}{2\omega} - t\right]_0^{\frac{2\pi}{\omega}} + \frac{B}{2}\left[\frac{\cos 2\omega t}{2\omega}\right]_0^{\frac{2\pi}{\omega}} \\
&= -\frac{\pi A}{\omega}
\end{aligned} \quad (4)$$

$$\begin{aligned}
\mathrm{Re}[F_s(\omega)] &= \int_0^{\frac{2\pi}{\omega}} F(t)\cos\omega t\, dt \\
&= \int_0^{\frac{2\pi}{\omega}} (A\sin\omega t + B\cos\omega t)\sin\omega t\, dt \\
&= A\int_0^{\frac{2\pi}{\omega}} \sin\omega t \cos\omega t\, dt + B\int_0^{\frac{2\pi}{\omega}} (\cos\omega t)^2 dt \\
&= \frac{A}{2}\int_0^{\frac{2\pi}{\omega}} \sin 2\omega t\, dt + \frac{B}{2}\int_0^{\frac{2\pi}{\omega}} (\cos 2\omega t + 1) dt \\
&= -\frac{A}{2}\left[\frac{\cos 2\omega t}{2\omega}\right]_0^{\frac{2\pi}{\omega}} + \frac{B}{2}\left[\frac{\sin 2\omega t}{2\omega} + t\right]_0^{\frac{2\pi}{\omega}} \\
&= \frac{\pi B}{\omega}
\end{aligned} \quad (5)$$

The capacitive component B is removed by Equation (4), and only the resistance component A is extracted. Similarly, the resistance component A is removed by Equation (5), and only the capacitive component B is extracted.

Figure 3:
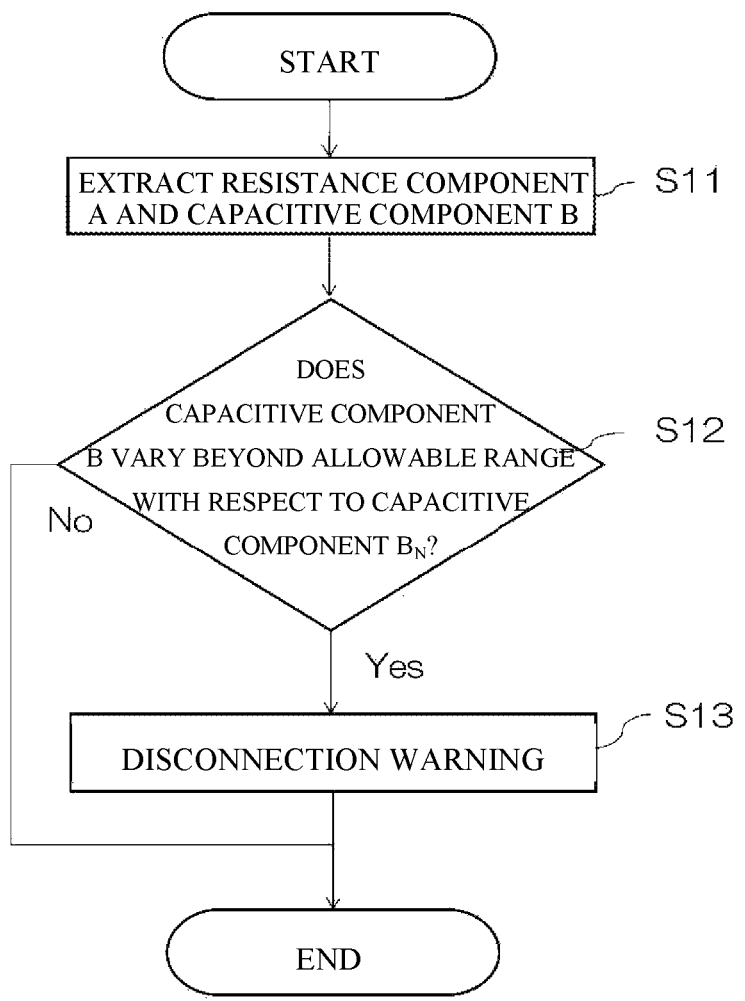
FIG. 3 is a flow chart showing a notice procedure of providing a disconnection warning.

FIG. 3 is a flowchart showing a notice procedure of providing a disconnection warning.

In the strain measurement circuit shown in FIG. 2, a check of whether or not the cable CL connecting the load cell 16 or the displacement meter 17 to the control device 20 is disconnected is always possible as long as a power source is input to the material testing machine and the signal from the strain gauge bridge circuit of each of the detectors can be received on the control device 20 side. When the signal input from the strain gauge bridge circuit of each of the detectors to the control device 20 via the cable CL is input to the detection circuit 41, the resistance component A and the capacitive component B are extracted from the above-described Equations (4) and (5) (Step S11). The resistance component A is input as a signal of the physical quantity to the MPU 51 and is displayed as the test force detected by the load cell 16 or the displacement detected by the displacement meter 17 on the display part 18.

The capacitive component B is sent to the comparator 47 and is compared with the normal capacitive component $B_N$ stored in the memory element 45 in advance. Here, the normal capacitive component $B_N$ stored in the memory element 45 is a value of the capacitive component B obtained by the above-described Equation (5), for example, when it can be recognized that it is normal, such as at the time of start of the first use of the cable CL, calibration of the detector, or the like. The comparison in the comparator 47 is to determine an extent to which the capacitive component B extracted from the signal of the detector at the current time varies with respect to the normal capacitive component $B_N$. Therefore, the comparator 47 compares the current capacitive component B extracted by the detection circuit 41 with the normal capacitive component $B_N$ and outputs a comparison result thereof to the MPU 51. The comparison result is a result derived based on a comparison between the current capacitive component B and the normal capacitive component $B_N$, such as the determination result of whether or not the capacitive component B varies beyond an allowable range with respect to the normal capacitive component $B_N$ (Step S12), or the like.

The MPU 51 which has received the comparison result provides a disconnection warning in accordance with the comparison result output from the comparator 47 (Step S13). For example, when the current capacitive component B varies beyond the allowable range with respect to the normal capacitive component $B_N$, the disconnection warning indicating "the disconnection of the cable" is provided to the display part 18 by the MPU 51 which has received the result. The disconnection warning is not limited to a warning display on the display part 18, and other methods, such as a warning sound, may be adopted.

As described above, in the embodiment, when the signal (the resistance component A) indicating the physical quantity is taken out from the input signal by digitizing the signal from the detector input to the control device 20 using the A/D converter 34 and inputting it to the detection circuit 41, the signal (the capacitive component B) caused by the electrostatic capacitance of the cable CL can also be taken out without providing an independent disconnection detection circuit. Then, the signal caused by the electrostatic capacitance of the normal cable CL is stored in advance in the memory element 45, and when a difference from the stored value becomes large, it is determined that the cable CL is disconnected, and a user is warned. Therefore, the user can always be aware of the disconnection, and it is possible to prevent unnecessary continuation of the test.

Further, since the signal caused by the electrostatic capacitance of the cable CL extracted at predetermined time intervals by the detection circuit 41 can also be taken out as a continuous quantity, it is possible to determine not only complete disconnection of the cable CL but also a state of being almost disconnected from a tendency of change of the capacitance component B with time. If the cable CL can be replaced or repaired before the cable CL is completely disconnected, waste of the test piece 10 and the test time can be prevented.

In the above-described embodiment, the detector having the strain gauge bridge circuit has been described as an example. However, the capacitance component caused by the electrostatic capacitance of the cable CL from the signal input via the cable CL can also be extracted and used to determine the presence or absence of the disconnection of the cable CL in detectors having other AC measurement circuits by adopting the detection circuit 41 and the comparator 47 similar to the embodiment. For example, the embodiments of the disclosure can be applied to detection of disconnection of a cable CL in a differential transformer type displacement meter in which a primary coil is excited with AC and displacement by an induced voltage generated in a secondary coil due to a movable iron core moving in conjunction with the elongation of the test piece 10 is detected.

What is claimed is:

1. A material testing machine comprising:
   a load mechanism configured to apply a test force to a test piece;
   a detector configured to measure a physical quantity when the test force is given to the test piece by the load mechanism;
   a control device;
   a cable configured to connect the detector with the control device; and
   a display part configured to display a measurement result of the detector,
   wherein the control device includes
   a detection circuit which extracts a resistance component input as a signal of the physical quantity comprising the test force detected by the load mechanism and a capacitive component caused by an electrostatic capacitance of the cable from a measurement signal from the detector,
   a memory element which stores a normal capacitive component extracted by the detection circuit, and
   a comparator which compares a current capacitive component extracted by the detection circuit with the normal capacitive component, and
   when a comparison result from the comparator indicates that a value of the current capacitive component varies beyond a predetermined allowable range with respect to the normal capacitive component, it is treated that the cable is disconnected, and a disconnection warning is provided.

2. The material testing machine according to claim 1, wherein the control device provides the disconnection warning by displaying a warning on the display part.

3. The material testing machine according to claim 1, wherein the detector is a load cell which has a strain gauge bridge circuit as a physical quantity detection mechanism and measures the test force applied to the test piece, or a displacement meter which has the strain gauge bridge circuit as the physical quantity detection mechanism and measures elongation of the test piece.

4. The material testing machine according to claim 2, wherein the detector is a load cell which has a strain gauge bridge circuit as a physical quantity detection mechanism and measures the test force applied to the test piece, or a displacement meter which has the strain gauge bridge circuit as the physical quantity detection mechanism and measures elongation of the test piece.

* * * * *